United States Patent
Cui et al.

(10) Patent No.: US 11,811,240 B2
(45) Date of Patent: **\*Nov. 7, 2023**

(54) RECTIFIER IN LOW GAIN WIRELESS POWER TRANSFER SYSTEM

(71) Applicant: NuVolta Technologies (Hefei) Co., Ltd., Hefei (CN)

(72) Inventors: Kaiyong Cui, Shanghai (CN); Zhengyu Li, Shanghai (CN); Zeng Li, Shanghai (CN); Zhijun Luo, Shanghai (CN)

(73) Assignee: Nuvolta Technologies (Hefei) Co., Ltd., Hefei (CN)

( * ) Notice: Subject to any disclaimer, the term of this patent is extended or adjusted under 35 U.S.C. 154(b) by 30 days.

This patent is subject to a terminal disclaimer.

(21) Appl. No.: 17/234,016

(22) Filed: Apr. 19, 2021

(65) Prior Publication Data

US 2022/0320905 A1    Oct. 6, 2022

(30) Foreign Application Priority Data

Mar. 30, 2021 (CN) .......................... 202110345121.X

(51) Int. Cl.
*H02J 50/12* (2016.01)
*H02J 7/02* (2016.01)

(52) U.S. Cl.
CPC .............. *H02J 50/12* (2016.02); *H02J 7/02* (2013.01); *H02J 2207/20* (2020.01)

(58) Field of Classification Search
CPC .......... H02J 50/12; H02J 7/02; H02J 2207/20; H02J 50/10; Y02B 70/10; H02M 7/219
See application file for complete search history.

(56) References Cited

U.S. PATENT DOCUMENTS

| | | | | |
|---|---|---|---|---|
| 9,948,204 | B2* | 4/2018 | Fornage | H02M 7/217 |
| 10,644,531 | B1* | 5/2020 | Qiu | H02J 50/10 |
| 2015/0244176 | A1* | 8/2015 | Van Den Brink | H02J 50/80 307/104 |
| 2016/0176300 | A1* | 6/2016 | Bucher | B60L 53/122 307/104 |
| 2018/0212471 | A1* | 7/2018 | Neuburger | H02J 50/12 |
| 2018/0262057 | A1* | 9/2018 | Lee | H02J 50/12 |
| 2019/0356149 | A1* | 11/2019 | Li | H02J 50/12 |
| 2019/0366866 | A1* | 12/2019 | Cha | H02J 50/80 |
| 2022/0302759 | A1* | 9/2022 | Li | H02J 50/12 |
| 2022/0320907 | A1* | 10/2022 | Cui | H02J 7/02 |

FOREIGN PATENT DOCUMENTS

| | | | | |
|---|---|---|---|---|
| CN | 111799891 A | * | 10/2020 | .............. H02J 5/005 |
| CN | 111799891 A | | 10/2020 | |
| WO | WO-2011102910 A1 | * | 8/2011 | .......... H02M 3/3376 |

\* cited by examiner

*Primary Examiner* — Jared Fureman
*Assistant Examiner* — Michael J Warmflash
(74) *Attorney, Agent, or Firm* — AP3 Law Firm PLLC

(57) ABSTRACT

An apparatus includes a receiver coil configured to be magnetically coupled to a transmitter coil, and a rectifier circuit coupled to two terminals of the receiver coil, wherein in response to a high system gain of the apparatus, the rectifier circuit is configured as a half-bridge rectifier, and in response to a low system gain of the apparatus, the rectifier circuit is configured as a full-bridge rectifier.

20 Claims, 9 Drawing Sheets

RECTIFIER IN LOW GAIN WIRELESS POWER TRANSFER SYSTEM

PRIORITY CLAIM

This application claims priority to Chinese Patent Application No. 202110345121.X, filed on Mar. 30, 2021, which is hereby incorporated by reference in its entirety.

TECHNICAL FIELD

The present invention relates to a rectifier circuit in a low gain wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As power consumption has become more important, there may be a need for high power density and high efficiency wireless power transfer systems. In a high power wireless transfer system, a larger current output leads to a temperature rise in the receiver coil of the wireless power transfer system. Such a temperature rise causes poor system efficiency. In order to overcome this drawback, a low inductance receiver coil may be employed to reduce the temperature rise in the receiver coil. However, the receiver having a low inductance receiver coil may be used in a variety of applications such as a low power application (e.g., the power of the wireless power transfer system is less than 10 W). In the low power application, the receiver having a low inductance receiver coil is not compatible with a low power transmitter (e.g., a transmitter having a low input voltage). It would be desirable to have a high performance receiver exhibiting good behaviors. For example, a high efficiency receiver is compatible with a variety of operating conditions.

SUMMARY

These and other problems are generally solved or circumvented, and technical advantages are generally achieved, by preferred embodiments of the present disclosure which provide a high efficiency rectifier circuit compatible with a variety of operating conditions.

In accordance with an embodiment, an apparatus comprises a receiver coil configured to be magnetically coupled to a transmitter coil, and a rectifier circuit coupled to two terminals of the receiver coil, wherein in response to a high system gain of the apparatus, the rectifier circuit is configured as a half-bridge rectifier, and in response to a low system gain of the apparatus, the rectifier circuit is configured as a full-bridge rectifier.

In accordance with another embodiment, a method comprises determining a system gain of a wireless power transfer system comprising a transmitter coil, a receiver coil and a rectifier circuit coupled to the receiver coil, in response to a high system gain application of the wireless power transfer system, configuring the rectifier circuit as a half-bridge rectifier, and in response to a low system gain application of the wireless power transfer system, configuring the rectifier circuit as a full-bridge rectifier.

In accordance with yet another embodiment, a system comprises a transmitter coil coupled to an input power source through a transmitter circuit, a receiver coil magnetically coupled to the transmitter coil, and a rectifier circuit coupled to the receiver coil, wherein in response to a low input voltage of the system, the rectifier circuit is configured as a half-bridge rectifier to boost an output voltage of the system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a rectifier circuit compatible with different operating conditions of a wireless power transfer system. The invention may also be applied, however, to a variety of power conversion devices of the wireless power transfer system. Hereinafter, various embodiments will be explained in detail with reference to the accompanying drawings.

Figure 1:
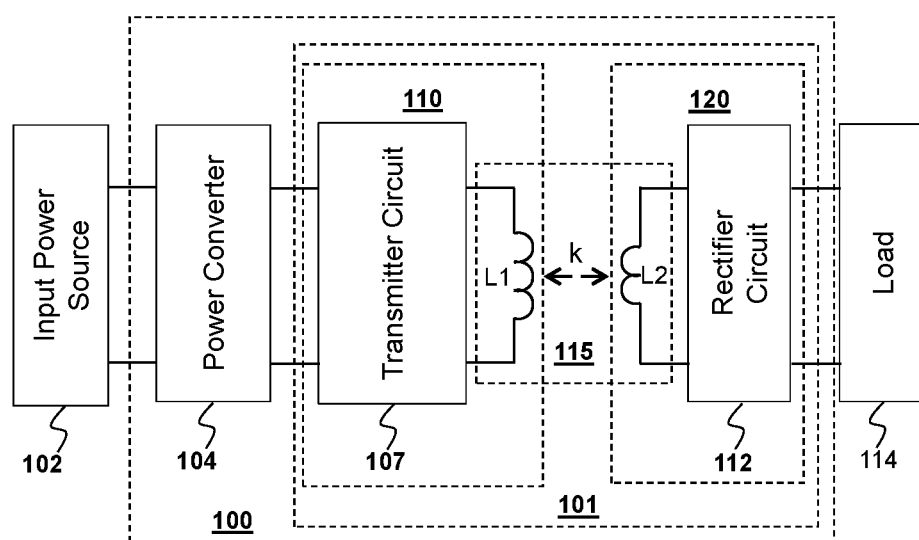
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power converter 104. The receiver 120 comprises a receiver coil L2 and a rectifier circuit 112 connected in cascade. The output of the rectifier circuit 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge converter according to some embodiments. Alternatively, the transmitter circuit 107 may comprise the primary side switches of other converters such as a half-bridge converter, a push-pull converter and the like.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier circuit 112. The receiver 120 may comprise a secondary resonant capacitor.

The rectifier circuit 112 converts an alternating polarity waveform received from the output of the receiver coil L2 to a single polarity waveform. In some embodiments, the rectifier circuit 112 is a full-wave bridge formed by switching elements such as n-type metal oxide semiconductor (NMOS) transistors.

Furthermore, the rectifier circuit 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter.

The implementation of the power converter 104 described above is merely an example, which should not unduly limit the scope of the claims. One of ordinary skill in the art would recognize many variations, alternatives, and modifications.

In operation, the wireless power transfer system 100 may be configured to operate in a low system gain application. More particularly, when the wireless power transfer system 100 is configured to transfer a large amount of power, the system gain is lowered to reduce the coil temperature, thereby improving efficiency. In the low system gain application, the maximum power transferred between the transmitter and the receiver is in a range from about 40 W to about 80 W. On the other hand, the wireless power transfer system 100 may be configured to operate in a high system gain application. More particularly, when the wireless power transfer system 100 is configured to transfer a small amount of power, or the input voltage of the wireless power transfer system is low, the system gain of the wireless power transfer system 100 is boosted so as to generate a high output voltage suitable for the load coupled to the wireless power transfer system. In the high system gain application, the maximum power transferred between the transmitter and the receiver is in a range from about 5 W to about 10 W. It should be noted that the power levels of the high gain application and the low gain application described above are merely examples, which should not unduly limit the scope of the claims. One of ordinary skill in the art would recognize many variations, alternatives, and modifications. For example, depending on different applications and design needs, the power transferred between the transmitter and the receiver in the low gain application may be greater than 120 W. Furthermore, the power transferred between the transmitter and the receiver in the high gain application may be in a range from about 30 W to about 40 W.

In some embodiments, the rectifier circuit 112 is configured as either a half-bridge rectifier or a full-bridge rectifier so that the receiver 120 is compatible with different applications. More particularly, when the wireless power transfer system 100 is configured to transfer a large amount of power, the receiver 120 and the transmitter 110 form a low gain wireless power transfer system. In some embodiments, the gain between the receiver and the transmitter is about 0.5. For example, when the input voltage of the transmitter is about 20 V, the output voltage of the receiver is about 10 V. It should be noted that the voltage levels described above are merely examples, which should not unduly limit the scope of the claims.

In the low gain wireless power transfer system, the rectifier circuit 112 is configured as a full-bridge rectifier. The power is transferred between the transmitter coil L1 and the receiver coil L2. The receiver coil L2 is smaller than the transmitter coil L1. More particularly, the receiver coil L2 is of a small inductance in comparison with the transmitter coil L1. Such a small inductance coil helps to reduce the resistance of the receiver coil, thereby reducing the thermal stress on the receiver 120.

On the other hand, when the wireless power transfer system 100 is configured to transfer a small amount of power, the rectifier circuit 112 is configured as a half-bridge rectifier. The half-bridge rectifier functions as a voltage booster for increasing the output voltage of the wireless power transfer system 100. The voltage booster is of a gain from about 1.3 to about 2. The voltage booster helps to boost the gain of the wireless power transfer system so that the wireless power transfer system has a normal gain. In some embodiments, the normal gain between the receiver and the transmitter is about 0.9.

Figure 2:
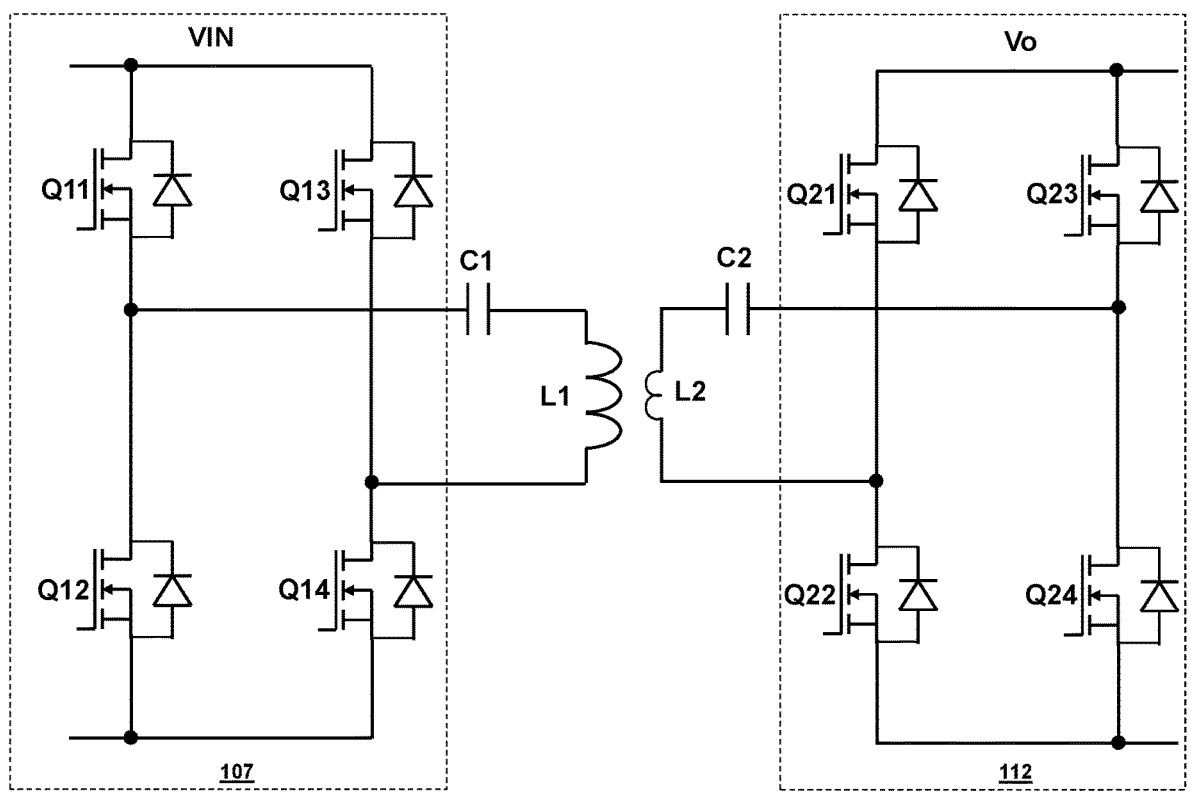
FIG. 2 illustrates a schematic diagram of the wireless power transfer device shown in FIG. 1 in accordance with various embodiments of the present disclosure.

FIG. 2 illustrates a schematic diagram of the wireless power transfer device shown in FIG. 1 in accordance with various embodiments of the present disclosure. Referring back to FIG. 1, the wireless power transfer device 101 comprises a transmitter circuit 107, a transmitter coil L1, a receiver coil L2 and a rectifier circuit 112.

The transmitter circuit 107 is implemented as a full-bridge as shown in FIG. 2. Throughout the description, the transmitter circuit 107 may be alternatively referred to as the full-bridge 107. The transmitter circuit 107 includes four switching elements, namely Q11, Q12, Q13 and Q14. As shown in FIG. 2, the switching elements Q11 and Q12 are connected in series between an input voltage bus VIN and ground. The input voltage bus VIN is connected to the output of the power converter 104 shown in FIG. 1. Likewise, the switching elements Q13 and Q14 are connected in series between the input voltage bus VIN and ground. The common node of the switching elements Q11 and Q12 is coupled to a first input terminal of the transmitter coil L1 through the transmitter resonant capacitor C1. The common node of the switching elements Q13 and Q14 is coupled to a second input terminal of the transmitter coil L1.

According to some embodiments, the switching elements Q11, Q12, Q13 and Q14 are implemented as MOSFET or MOSFETs connected in parallel, any combinations thereof and/or the like. According to alternative embodiments, the switching elements (e.g., switch Q11) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge 107 shown in FIG. 2), the implementation of the transmitter circuit 107 shown in FIG. 2 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 107 illustrated herein is limited solely for the purpose of clearly illustrating the inventive aspects of the various embodiments. The present invention is not limited to any particular power topology.

It should further be noted that while FIG. 2 illustrates four switches Q11, Q12, Q13 and Q14, various embodiments of the present disclosure may include other variations, modifications and alternatives. For example, a separate capacitor may be connected in parallel with each switch of the full-bridge 107. Such a separate capacitor helps to better control the timing of the resonant process of the full-bridge 107.

The outputs of the receiver coil L2 are coupled to the load (shown in FIG. 1) through the receiver resonant capacitor C2, the rectifier circuit 112 and an output capacitor. The rectifier circuit 112 converts an alternating polarity waveform received from the outputs of the receiver coil L2 to a single polarity waveform. The receiver resonant capacitor C2 helps to achieve soft switching for the wireless power transfer system.

The rectifier circuit 112 includes four switches, namely Q21, Q22, Q23 and Q24. As shown in FIG. 2, the switches Q21 and Q22 are connected in series between the output terminal (Vo) of the wireless power transfer system and ground. Likewise, the switches Q23 and Q24 are connected in series between the output terminal Vo and ground. As shown in FIG. 2, the common node of the switches Q21 and Q22 is coupled to a first terminal of the receiver coil L2 through the receiver resonant capacitor C2. The common node of the switches Q23 and Q24 is coupled to a second terminal of the receiver coil L2.

According to some embodiments, the switches Q21, Q22, Q23 and Q24 are implemented as MOSFET or MOSFETs connected in parallel, any combinations thereof and/or the like. According to alternative embodiments, the switching elements (e.g., switch Q21) may be an IGBT device. Alternatively, the primary switches can be any controllable switches such as IGCT devices, GTO devices, SCR devices, JFET devices, MCT devices, GaN based power devices and/or the like.

It should be noted that while FIG. 2 illustrates four switches Q21, Q22, Q23 and Q24, various embodiments of the present disclosure may include other variations, modifications and alternatives. For example, a separate capacitor may be connected in parallel with each switch of the rectifier circuit. Such a separate capacitor helps to better control the timing of the resonant process of the rectifier circuit.

In operation, the wireless power transfer system may be used in both the high system gain application and the low system gain application. In the high system gain application, two different configurations are applicable to the receiver. In a first configuration of the receiver, the second switch Q22 is configured as an always-on switch. The rectifier circuit 112 is configured to operate in two different phases in response to the first configuration of the receiver. In the two different phases of the first configuration of the receiver, the receiver coil L2, the receiver resonant capacitor C2, and switches Q21-Q24 form a half-bridge rectifier. A sum of a voltage across the receiver coil L2 and a voltage across the receiver capacitor C2 is applied to a load coupled to the apparatus through the second switch Q22 and the third switch Q23. The detailed operating principle of these two phases will be discussed below with respect to FIGS. 3-4.

In a second configuration of the receiver, the fourth switch Q24 is configured as an always-on switch. The rectifier circuit is configured to operate in two different phases in response to the second configuration of the receiver. In the two different phases of the second configuration of the receiver, the receiver coil L2, the receiver resonant capacitor C2, and switches Q21-Q24 form a half-bridge rectifier. A sum of a voltage across the receiver coil L2 and a voltage across the receiver capacitor C2 is applied to a load coupled to the apparatus through the fourth switch Q24 and the first switch Q21. The detailed operating principle of these two phases will be discussed below with respect to FIGS. 5-6.

In the low system gain application, the rectifier circuit 112 is configured to operate in two different phases. The detailed operating principle of these two phases will be discussed below with respect to FIGS. 7-8.

Figure 3:
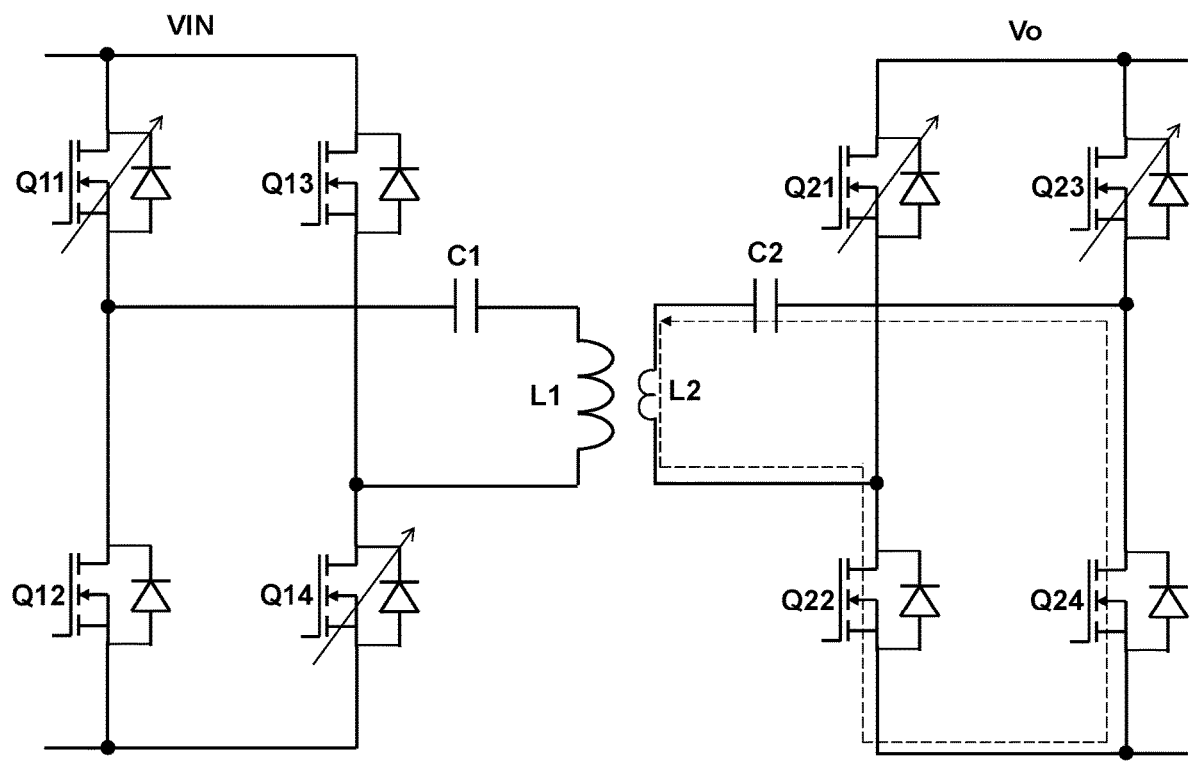
FIG. 3 illustrates a schematic diagram of the rectifier circuit configured to operate in a first phase of the first configuration of the receiver in the high system gain application in accordance with various embodiments of the present disclosure.

FIG. 3 illustrates a schematic diagram of the rectifier circuit configured to operate in a first phase of the first configuration of the receiver in the high system gain application in accordance with various embodiments of the present disclosure. In some embodiments, the receiver shown in FIG. 2 is configured to receive a small amount of power. The transmitter is a low power transmitter. For example, the power transferred between the transmitter and the receiver is in a range from about 5 W to about 10 W. The input voltage of the transmitter is about 10 V. In order to be compatible with the low power transmitter, the gain of the receiver has to be increased accordingly. As shown in FIG. 3, the switch Q22 is configured as an always-on switch during the high system gain application. As a result of configuring the switch Q22 as an always-on switch, the second receiver coil L3 and the capacitor C2 form a half-bridge rectifier. Such a half-bridge rectifier helps to increase the gain of the receiver.

In the first phase of the first configuration of the receiver, the switches Q11, Q14, Q21 and Q23 are turned off as indicated by the arrows on the respective symbols. The switches Q12, Q13, Q22 and Q24 are turned on. As indicated by the dashed line shown in FIG. 3, the current flows through the switch Q24, the receiver capacitor C2, the receiver coil L2 and the switch Q22. The current is used to charge the receiver capacitor C2. The voltage across the receiver capacitor C2 is approximately equal to the voltage across the receiver coil L2.

Figure 4:
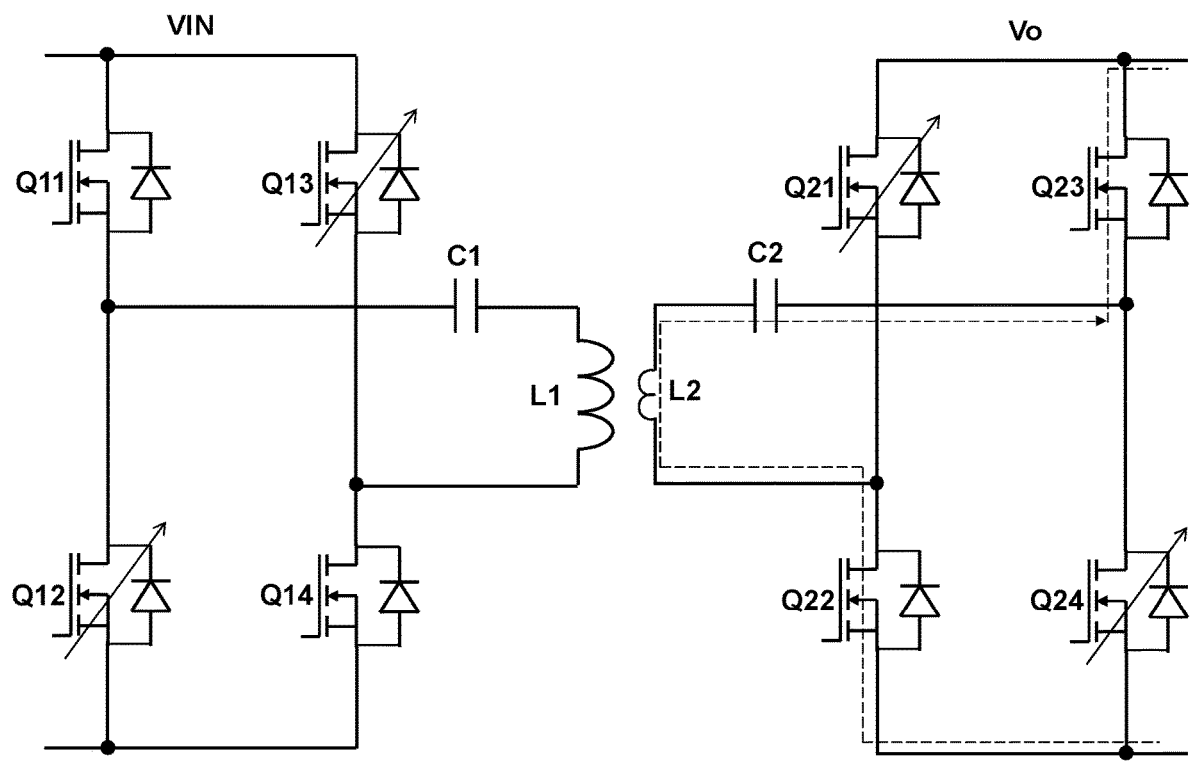
FIG. 4 illustrates a schematic diagram of the rectifier circuit configured to operate in a second phase of the first configuration of the receiver in the high system gain application in accordance with various embodiments of the present disclosure.

FIG. 4 illustrates a schematic diagram of the rectifier circuit configured to operate in a second phase of the first configuration of the receiver in the high system gain application in accordance with various embodiments of the present disclosure. In the second phase of the first configuration of the receiver, the switches Q12, Q13, Q21 and Q24 are turned off as indicated by the arrows on the respective symbols. The switches Q11, Q14, Q22 and Q23 are turned on. As indicated by the dashed line shown in FIG. 4, the current flows through the switch Q22, the receiver coil L2, the receiver capacitor C2 and the switch Q23. A sum of the voltage across the receiver coil L2 and the voltage across the receiver capacitor C2 is applied to the output terminal Vo.

In some embodiments, in the first phase and the second phase discussed above, the duty cycle of the transmitter circuit may be adjustable so as to adjust the voltage across the receiver capacitor C2. For example, by reducing the time of the first phase, the receiver capacitor C2 is not fully charged. As a result of having a short charge time, the voltage across the receiver capacitor C2 is reduced accordingly. In other words, by controlling the time of the first phase, the voltage across the receiver capacitor C2 is adjusted accordingly. In some embodiments, depending on different power levels of the wireless power transfer system, the voltage across the receiver capacitor C2 is adjusted gradually so that the gain of the wireless power transfer system is inversely proportional to the power level of the wireless power transfer system.

Figure 5:
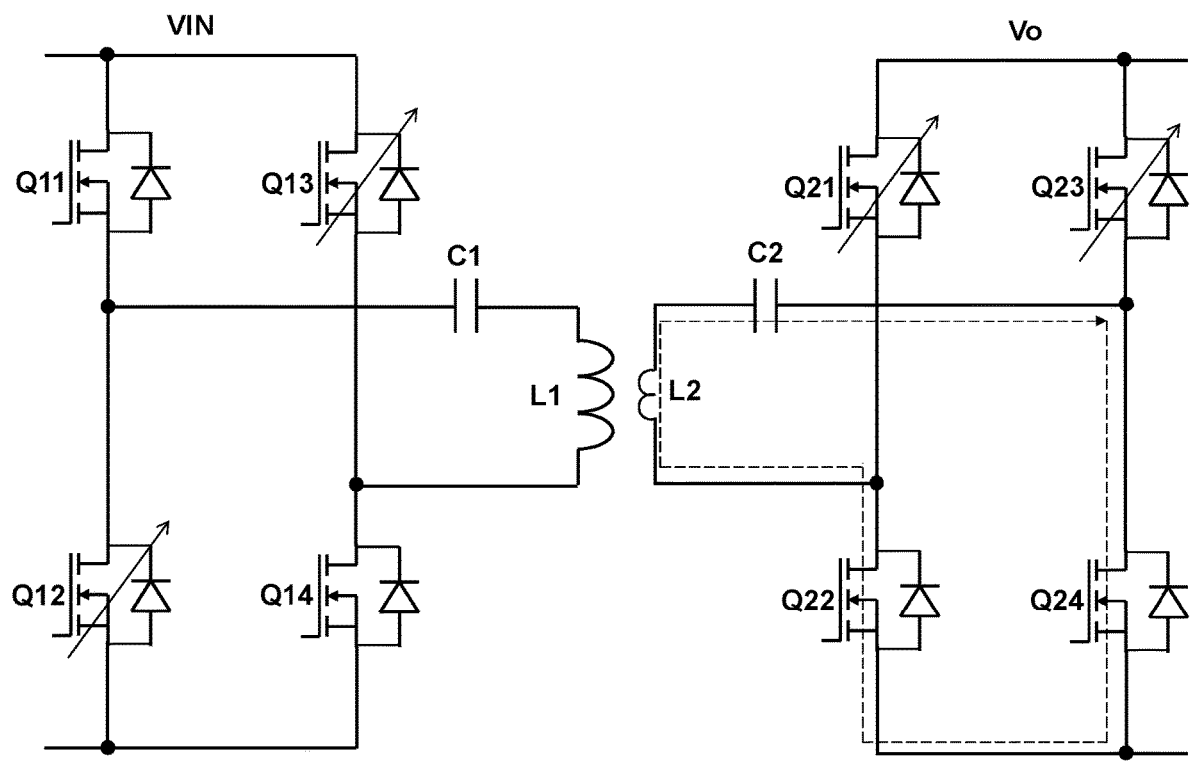
FIG. 5 illustrates a schematic diagram of the rectifier circuit configured to operate in a first phase of the second configuration of the receiver in the high system gain application in accordance with various embodiments of the present disclosure.

FIG. 5 illustrates a schematic diagram of the rectifier circuit configured to operate in a first phase of the second configuration of the receiver in the high system gain application in accordance with various embodiments of the present disclosure. In the first phase of the second configuration of the receiver, the switches Q12, Q13, Q21 and Q23 are turned off as indicated by the arrows on the respective symbols. The switches Q11, Q14, Q22 and Q24 are turned on. As indicated by the dashed line shown in FIG. 5, the current flows through the switch Q22, the receiver coil L2, the receiver capacitor C2 and the switch Q24. The current is used to charge the receiver capacitor C2. The voltage across the receiver capacitor C2 is approximately equal to the voltage across the receiver coil L2.

Figure 6:
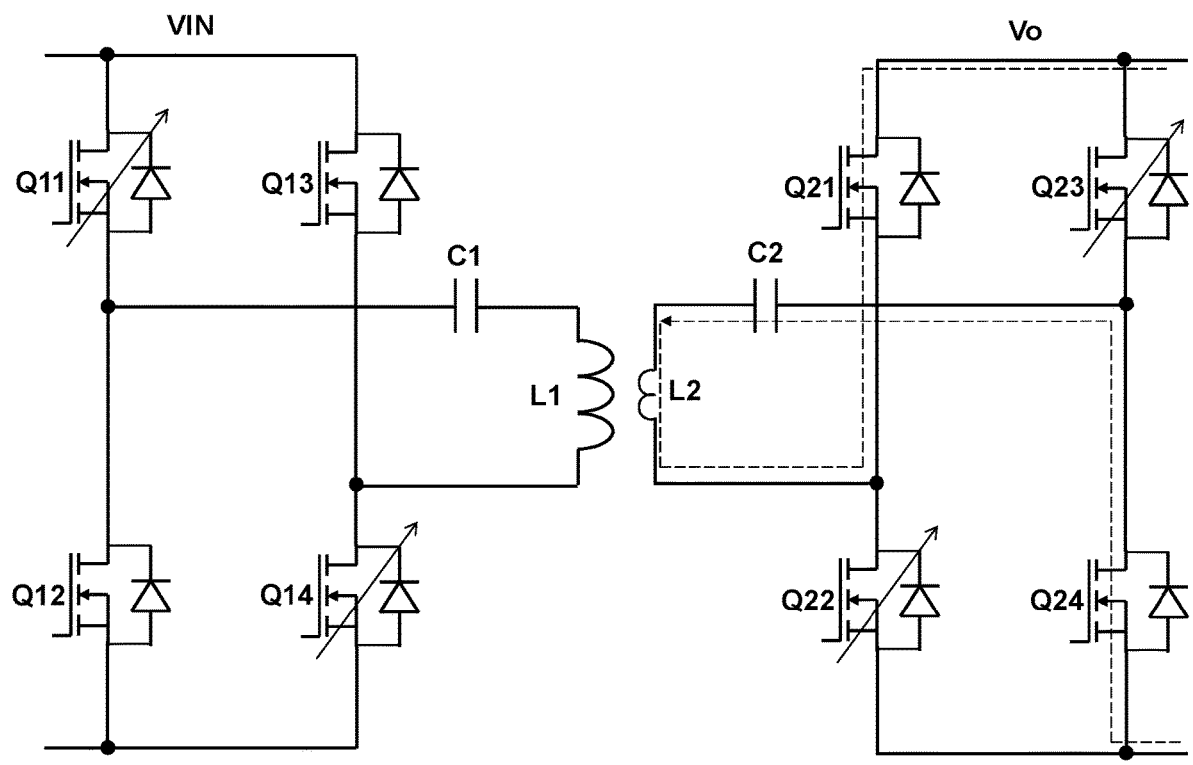
FIG. 6 illustrates a schematic diagram of the rectifier circuit configured to operate in a second phase of the second configuration of the receiver in the high system gain application in accordance with various embodiments of the present disclosure.

FIG. 6 illustrates a schematic diagram of the rectifier circuit configured to operate in a second phase of the second configuration of the receiver in the high system gain application in accordance with various embodiments of the present disclosure. In the second phase of the second configuration of the receiver, the switches Q11, Q14, Q22 and Q23 are turned off as indicated by the arrows on the respective symbols. The switches Q12, Q13, Q21 and Q24 are turned on. As indicated by the dashed line shown in FIG. 6, the current flows through the switch Q24, the receiver capacitor C2, the receiver coil L2 and the switch Q21. A sum of the voltage across the receiver coil L2 and the voltage across the receiver capacitor C2 is applied to the output terminal Vo.

Figure 7:
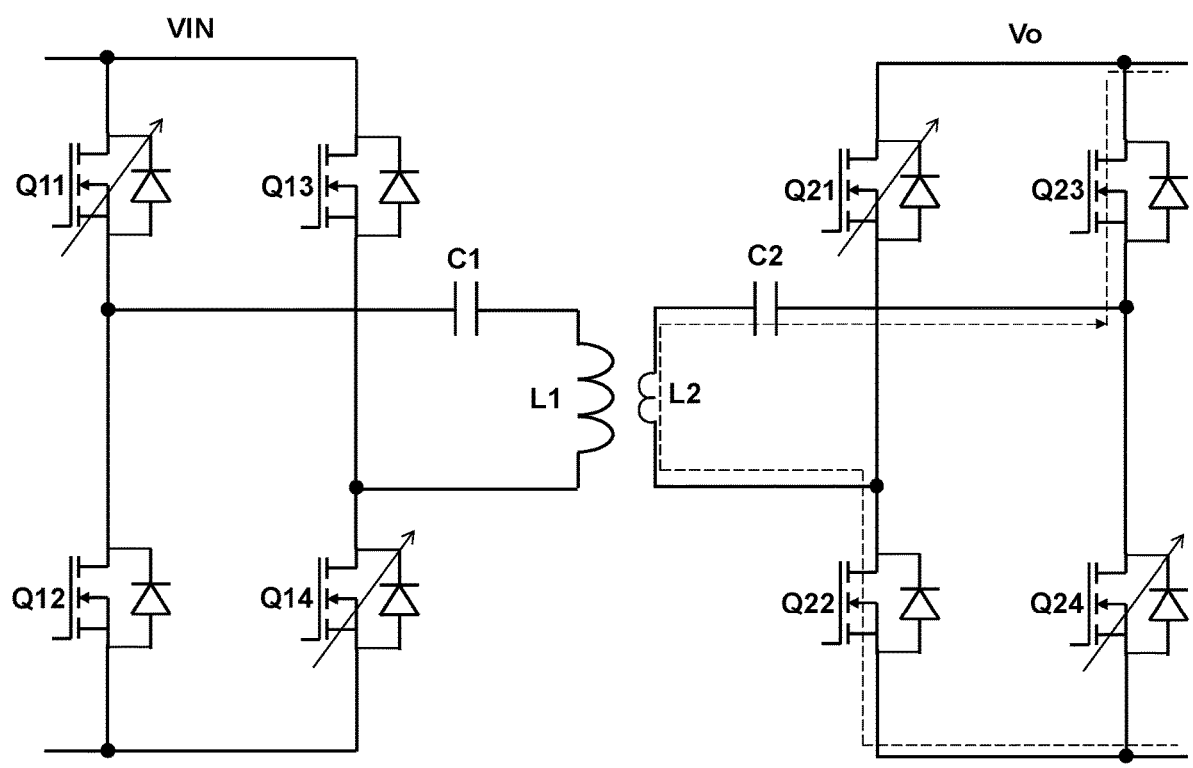
FIG. 7 illustrates a schematic diagram of the rectifier circuit configured to operate in a first phase of the low system gain application in accordance with various embodiments of the present disclosure.

FIG. 7 illustrates a schematic diagram of the rectifier circuit configured to operate in a first phase of the low system gain application in accordance with various embodiments of the present disclosure. In the low system gain application, the transmitter is a high power transmitter. For example, the power transferred between the transmitter and the receiver is in a range from about 40 W to about 80 W. The input voltage of the transmitter is about 20 V. In order to be compatible with the high power transmitter, the gain of the receiver has to be reduced accordingly. The rectifier circuit is configured as a full-bridge rectifier to lower the gain of the wireless power system.

In the first phase of the low system gain application, the switches Q11, Q14, Q21 and Q24 are turned off as indicated by the arrows on the respective symbols. The switches Q12, Q13, Q22 and Q23 are turned on. The current flows through the switch Q22, the receiver coil L2, the receiver capacitor C2 and the switch Q23 as indicated by the dashed line shown in FIG. 7.

Figure 8:
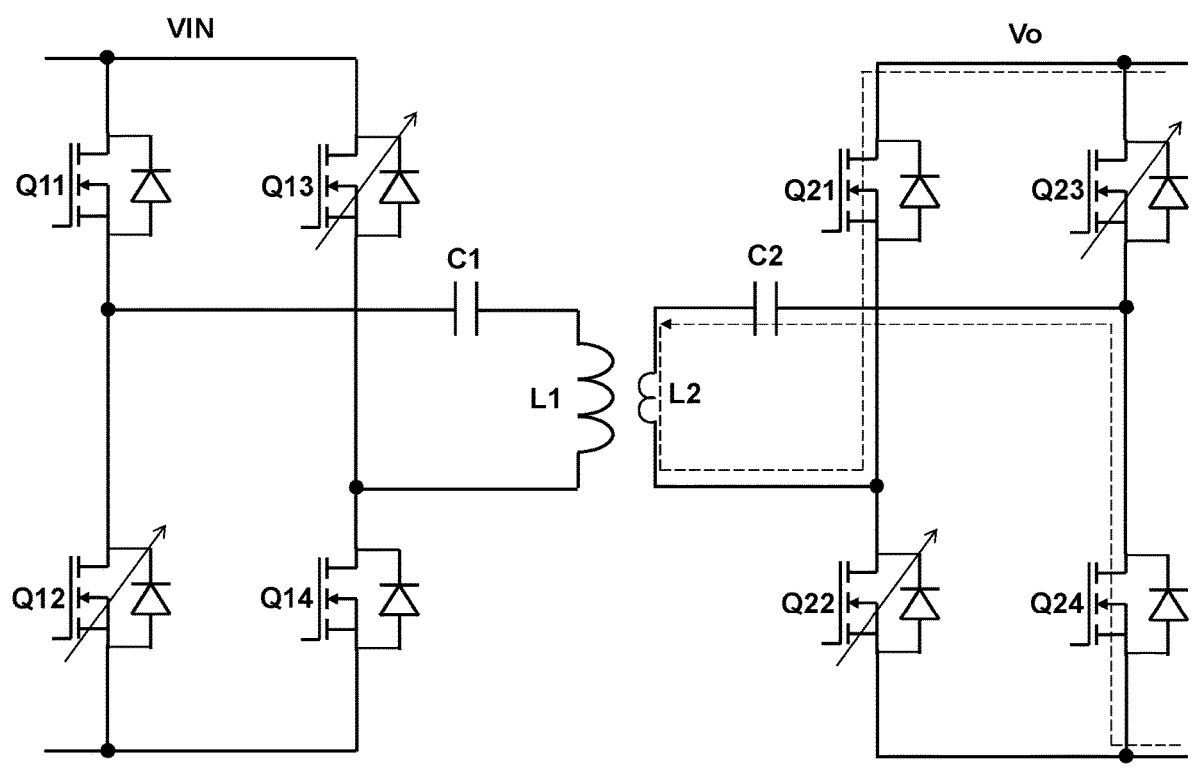
FIG. 8 illustrates a schematic diagram of the rectifier circuit configured to operate in a second phase of the low system gain application in accordance with various embodiments of the present disclosure.

FIG. 8 illustrates a schematic diagram of the rectifier circuit configured to operate in a second phase of the low system gain application in accordance with various embodiments of the present disclosure. In the second phase of the low system gain application, the switches Q12, Q13, Q22 and Q23 are turned off as indicated by the arrows on the respective symbols. The switches Q11, Q14, Q21 and Q24 are turned on. The current flows through the switch Q24, the receiver capacitor C2, the receiver coil L2 and the switch Q21 as indicated by the dashed line shown in FIG. 8.

One advantageous feature of having the low system gain application described above with respect to FIGS. 7-8 is the receiver shown in FIG. 2 is able to achieve high efficiency. In particular, the inductance of the receiver coil L2 is small in comparison with the inductance of the transmitter coil L1. Such a small inductance coil has low resistance. The low resistance helps to reduce the coil temperature, thereby improving the efficiency of the wireless power transfer system.

Figure 9:
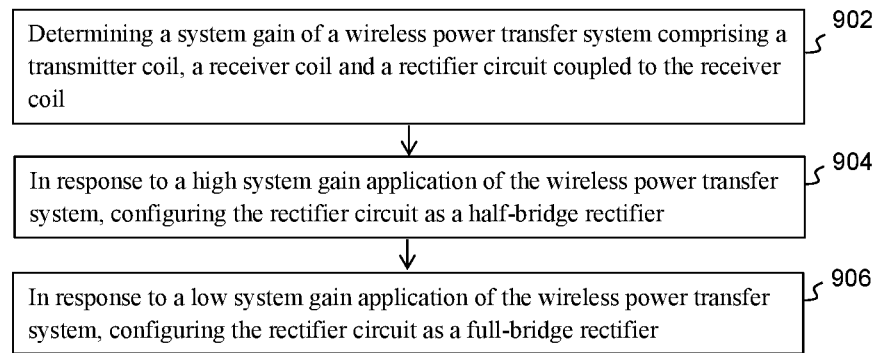
FIG. 9 illustrates a flow chart of controlling the receiver shown in FIG. 2 in accordance with various embodiments of the present disclosure.

FIG. 9 illustrates a flow chart of controlling the receiver shown in FIG. 2 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

Referring back to FIG. 1, the wireless power transfer system comprises a transmitter and a receiver. Depending on different applications, the transmitter may be a high power transmitter. When the receiver (e.g., receiver shown in FIG. 2) is magnetically coupled to this high power transmitter, the receiver is configured to operate in a low system gain application. On the other hand, when the transmitter is a low power transmitter, the receiver is configured to operate in a high system gain application.

The receiver comprises a rectifier circuit. Depending on different system gain applications, the rectifier circuit may be configured differently so that the receiver is compatible with different applications. The receiver is controlled according to the following steps.

At step 902, a controller is configured to determine a system gain of the wireless power transfer system. The wireless power transfer system comprises a transmitter coil, a receiver coil and a rectifier circuit coupled to the receiver coil. The wireless power transfer system may transfer a small amount of power, which requires a normal gain between the transmitter and the receiver. On the other hand, the wireless power transfer system may transfer a large amount of power, which requires a reduced gain between the transmitter and the receiver.

At step 904, in response to a high system gain application of the wireless power transfer system, the rectifier circuit is configured as a half-bridge rectifier.

At step 906, in response to a low system gain application of the wireless power transfer system, the rectifier circuit is configured as a full-bridge rectifier.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a receiver coil configured to be magnetically coupled to a transmitter coil; and
a rectifier circuit coupled to two terminals of the receiver coil, wherein:
in response to a high system gain of the apparatus, the rectifier circuit is configured as a half-bridge rectifier; and
in response to a low system gain of the apparatus, the rectifier circuit is configured as a full-bridge rectifier, wherein a system gain of the apparatus is a ratio of an output voltage of a receiver to an input voltage of a transmitter, and wherein the transmitter and the receiver are coupled to each other through the transmitter coil and the receiver coil, and wherein the rectifier circuit comprises a first switch and a second switch connected in series, and a third switch and a fourth switch connected in series, and wherein in response to the high system gain of the apparatus, in a first configuration of the high system gain of the apparatus, the second switch is configured as a first always-on switch, and in a second configuration of the high system gain of the apparatus, the fourth switch is configured as a second always-on switch.

2. The apparatus of claim 1, wherein:
a common node of the first switch and the second switch is connected to a first terminal of the receiver coil; and
a common node of the third switch and the fourth switch is connected to a second terminal of the receiver coil through a receiver capacitor.

3. The apparatus of claim 2, wherein:
in response to the high system gain of the apparatus, when the second switch is configured as the first always-on switch, a sum of a voltage across the receiver coil and a voltage across the receiver capacitor is applied to a load coupled to the apparatus through the second switch and the third switch.

4. The apparatus of claim 2, wherein:
in response to the high system gain of the apparatus, when the fourth switch is configured as the second always-on switch, a sum of a voltage across the receiver coil and a voltage across the receiver capacitor is applied to a load coupled to the apparatus through the first switch and the fourth switch.

5. The apparatus of claim 2, wherein:
in response to the low system gain of the apparatus, the rectifier circuit is configured to operate in two different phases.

6. The apparatus of claim 5, wherein:
in a first phase of the two different phases, the first switch and the fourth switch are turned off, and the second switch and the third switch are turned on; and
in a second phase of the two different phases, the first switch and the fourth switch are turned on, and the second switch and the third switch are turned off.

7. The apparatus of claim 1, wherein:
the receiver coil is magnetically coupled to the transmitter coil for transferring energy in a wireless power transfer system; and
a power level in response to the low system gain of the apparatus is higher than a power level in response to the high system gain of the apparatus.

8. The apparatus of claim 1, wherein:
the rectifier circuit has outputs coupled to a load and inputs connected to the two terminals of the receiver coil through a receiver capacitor, and wherein the rectifier circuit is configured to convert an alternating polarity waveform into a single polarity waveform, and wherein a voltage across the receiver capacitor is adjustable through adjusting a duty cycle of the apparatus.

9. A method comprising:
determining a system gain of a wireless power transfer system comprising a transmitter coil, a receiver coil and a rectifier circuit coupled to the receiver coil, wherein the system gain of the wireless power transfer system is a ratio of an output voltage of a receiver to an input voltage of a transmitter, and wherein the transmitter and the receiver are coupled to each other through the transmitter coil and the receiver coil;
in response to a high system gain application of the wireless power transfer system, configuring the rectifier circuit as a half-bridge rectifier; and
in response to a low system gain application of the wireless power transfer system, configuring the rectifier circuit as a full-bridge rectifier, wherein a power level of the low system gain application is higher than a power level in the high system gain application.

10. The method of claim 9, further comprising a receiver capacitor, wherein:
the rectifier circuit comprises a first switch and a second switch connected in series, and a third switch and a fourth switch connected in series, and wherein:
a common node of the first switch and the second switch is connected to a first terminal of the receiver coil; and
a common node of the third switch and the fourth switch is connected to a second terminal of the receiver coil through the receiver capacitor.

11. The method of claim 10, further comprising:
in a first phase of the high system gain application, configuring the rectifier circuit such that a current flows through the second switch, the receiver coil, the receiver capacitor and the fourth switch; and
in a second phase of the high system gain application, configuring the rectifier circuit such that the current flows through the second switch, the receiver coil, the receiver capacitor and the third switch.

12. The method of claim 10, further comprising:
in a first phase of the high system gain application, configuring the rectifier circuit such that a current flows through the second switch, the receiver coil, the receiver capacitor and the fourth switch; and
in a second phase of the high system gain application, configuring the rectifier circuit such that the current flows through the fourth switch, the receiver capacitor, the receiver coil and the first switch.

13. The method of claim 10, further comprising:
in a first phase of the low system gain application, configuring the rectifier circuit such that a current flows through the second switch, the receiver coil, the receiver capacitor and the third switch; and
in a second phase of the low system gain application, configuring the rectifier circuit such that the current flows through the fourth switch, the receiver capacitor, the receiver coil and the first switch.

14. The method of claim 10, further comprising:
reducing a duty cycle of the wireless power transfer system so that the receiver capacitor is not fully charged and a voltage across the receiver capacitor is reduced through adjusting the duty cycle, and gradually adjusting the voltage across the receiver capacitor so that a gain of the wireless power transfer system is inversely proportional to a power level of the wireless power transfer system.

15. The method of claim 9, wherein:
in the low system gain application, the system gain of the wireless power transfer system is less than 0.8; and
an inductance of the transmitter coil is greater than an inductance of the receiver coil.

16. The method of claim 9, wherein:
the half-bridge rectifier functions as a voltage booster.

17. A system comprising:
a transmitter coil coupled to an input power source through a transmitter circuit;
a receiver coil magnetically coupled to the transmitter coil; and
a rectifier circuit coupled to the receiver coil, wherein in response to a low input voltage and a high system gain of the system, the rectifier circuit is configured as a half-bridge rectifier to boost an output voltage of the system, wherein a system gain of the system is a ratio of an output voltage of a receiver of the system to an input voltage of a transmitter of the system, and wherein the transmitter and the receiver are coupled to each other through the transmitter coil and the receiver coil, and wherein the rectifier circuit comprises a first switch and a second switch connected in series, and a third switch and a fourth switch connected in series, and wherein in response to the high system gain of the system, in a first configuration of the high system gain of the system, the second switch is configured as a first always-on switch, and in a second configuration of the high system gain of the system, the fourth switch is configured as a second always-on switch.

18. The system of claim 17, wherein:
the rectifier circuit is coupled to the receiver coil through a capacitor.

19. The system of claim 17, wherein:
in response to a high input voltage of the system, the rectifier circuit is configured as a full-bridge rectifier.

20. The system of claim 19, wherein:
in response to the high input voltage of the system, the transmitter coil, the receiver coil and the rectifier circuit form a low gain wireless power transfer system.

* * * * *